United States Patent
Chin et al.

(10) Patent No.: US 10,764,379 B2
(45) Date of Patent: Sep. 1, 2020

(54) METHOD, APPARATUS AND SYSTEM FOR ENHANCING A USER'S ENGAGEMENT WITH A SERVICE

(71) Applicant: Nokia Technologies Oy, Espoo (FI)

(72) Inventors: Alvin Chin, Beijing (CN); Jilei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 372 days.

(21) Appl. No.: 14/915,841

(22) PCT Filed: Sep. 6, 2013

(86) PCT No.: PCT/CN2013/083050
§ 371 (c)(1),
(2) Date: Mar. 1, 2016

(87) PCT Pub. No.: WO2015/032065
PCT Pub. Date: Mar. 12, 2015

(65) Prior Publication Data
US 2016/0198011 A1 Jul. 7, 2016

(51) Int. Cl.
*G06F 17/00* (2019.01)
*H04L 29/08* (2006.01)
(Continued)

(52) U.S. Cl.
CPC ........ *H04L 67/22* (2013.01); *G06F 16/24578* (2019.01); *G06F 16/9535* (2019.01); *H04L 67/306* (2013.01)

(58) Field of Classification Search
CPC .......... G06F 17/3053; G06F 17/30867; G06F 16/24578; G06F 16/9535
See application file for complete search history.

(56) References Cited

U.S. PATENT DOCUMENTS 6,311,206 B1 10/2001 Malkin et al.
6,615,161 B1 * 9/2003 Carney ............... G06F 11/3485
702/186

(Continued)

FOREIGN PATENT DOCUMENTS

CN 101883125 A 11/2010
CN 102075531 A 5/2011
(Continued)

OTHER PUBLICATIONS

Yu, Kuifei, et al. "Towards personalized context-aware recommendation by mining context logs through topic models." Pacific-Asia Conference on Knowledge Discovery and Data Mining. Springer Berlin Heidelberg, 2012.

*Primary Examiner* — Hasanul Mobin
(74) *Attorney, Agent, or Firm* — Mintz Levin Cohn Ferris Glovsky and Popeo, P.C.

(57) ABSTRACT

Method, apparatus, system, computer program product and computer readable medium are disclosed for enhancing a user's engagement or experience with a service. The method comprises obtaining the user's current active level with respect to the service with respect to the service; determining a target active level; and sending the user a notification about the service at a time determined based on the user's current active level and the target active level, so that the user is notified of the service without being severely annoyed.

19 Claims, 9 Drawing Sheets

(51) Int. Cl.
*G06F 16/9535* (2019.01)
*G06F 16/2457* (2019.01)

(56) References Cited

U.S. PATENT DOCUMENTS

| | | | |
|---|---|---|---|
| 7,895,227 B1* | 2/2011 | Henderson | G06Q 30/02 707/769 |
| 8,203,977 B2 | 6/2012 | Walley et al. | |
| 8,504,680 B1* | 8/2013 | Hernacki | H04L 47/28 709/224 |
| 8,694,542 B2* | 4/2014 | Tiu, Jr. | G06F 17/30569 707/778 |
| 9,026,592 B1* | 5/2015 | Marra | H04L 29/06414 709/204 |
| 9,940,594 B1* | 4/2018 | Rosati | G06Q 10/06311 |
| 2002/0006192 A1* | 1/2002 | Bengtson | H04M 3/523 379/265.02 |
| 2002/0083148 A1* | 6/2002 | Shaw | H04L 29/06 709/214 |
| 2003/0200135 A1 | 10/2003 | Wright | |
| 2003/0217098 A1 | 11/2003 | Bobde et al. | |
| 2004/0003352 A1* | 1/2004 | Bargeron | G06F 17/24 715/230 |
| 2007/0180036 A1 | 8/2007 | Hebert et al. | |
| 2011/0125548 A1* | 5/2011 | Aharon | G06Q 10/04 705/7.28 |
| 2013/0013804 A1 | 1/2013 | Traynor | |
| 2013/0054706 A1* | 2/2013 | Graham | H04L 51/32 709/206 |
| 2013/0061046 A1 | 3/2013 | Joy et al. | |
| 2013/0085853 A1* | 4/2013 | Tseng | G06Q 30/0255 705/14.53 |
| 2013/0117254 A1* | 5/2013 | Manuel-Devadoss | G06F 17/30864 707/709 |
| 2013/0144974 A1 | 6/2013 | Haakenson et al. | |
| 2013/0282454 A1* | 10/2013 | Alpert | G06Q 30/0209 705/14.12 |
| 2014/0052488 A1* | 2/2014 | Minder | G06Q 10/06311 705/7.15 |
| 2014/0280556 A1* | 9/2014 | Kazi | H04L 51/32 709/204 |
| 2014/0350349 A1* | 11/2014 | Geurts | A61B 5/7475 600/300 |
| 2014/0365431 A1* | 12/2014 | Kapoor | G06Q 10/10 707/609 |

FOREIGN PATENT DOCUMENTS

| | | |
|---|---|---|
| CN | 102184253 A | 9/2011 |
| WO | WO-2010082885 A1 | 7/2010 |
| WO | WO-2012142751 A1 | 10/2012 |
| WO | WO-2014036854 A1 | 3/2014 |

* cited by examiner

| Notification | User | Frequency | Total # notified Recommended Items |
|---|---|---|---|
| # recommended Items for topic 1 | # recommended Items for topic 2 | # recommended Items for topic 3 | # recommended Items for topic N |
| Topic 1 | Topic 2 | Topic 3 | Topic N |

Figure 4

METHOD, APPARATUS AND SYSTEM FOR ENHANCING A USER'S ENGAGEMENT WITH A SERVICE

CROSS REFERENCE TO RELATED APPLICATIONS SECTION

This application is a national stage application, filed under 35 U.S.C. §371, of PCT Application No. PCT/CN2013/083050, filed on Sep. 6, 2013 entitled, "METHOD, APPARATUS AND SYSTEM FOR ENHANCING A USER'S ENGAGEMENT WITH A SERVICE," the contents which are hereby incorporated by reference in its entirety.

Field of the Invention

Embodiments of the disclosure generally relate to information technology, and, more particularly, to enhancement of user engagement to a service.

Background

User devices such as smart phones, tablets, and laptops have been widely used. A user can easily access various services with such a user device by using apps or browser. It has been of the interest of a service provider to keep users to use its application or service as often as possible, namely to make its application or service sticky. For example, WeChat is a successful messaging application that is used in China. People constantly use it every day, chatting with others and posting pictures and comments.

Operating systems for user devices like Windows, Android and iOS have notifications that can inform users of updates available for an application. Android and iOS send a notification immediately if one of the installed apps has new updates to the phone's notification bar. However, these conventional notifications may become too annoying and interrupt the user's experience. Sometimes they may even become like a spam. More often than not there is no need for real-time notifications, since they are not so urgent that need to be read right away.

Further, the conventional notifications are not based on a user's behavior or preferences, but are triggered by time and/or content. Namely, whenever a new message arrives for a user, the system will notify the user right away. However the user may not want to be notified at that time, and prefer to be notified after work on the bus or during lunch time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect of the disclosure, it is provided a method for enhancing a user's engagement or experience with a service (which is referred to as the user's active level), the method comprising: obtaining the user's current active level with respect to the service; determining a target active level; and sending the user a notification about the service at a time determined based on the user's current active level and the target active level.

According to another aspect of the present disclosure, it is provided a computer program product embodied on a distribution medium readable by a computer and comprising program instructions which, when loaded into a computer, execute the above-described method.

According to still another aspect of the present disclosure, it is provided a non-transitory computer readable medium having encoded thereon statements and instructions to cause a processor to execute the above-described method.

According to still another aspect of the present disclosure, it is provided a system for enhancing a user's engagement or experience with a service, the system comprising: an application configured to provide the service; a notification server configured to send the user a notification about the service at a time determined based on the user's current active level with respect to the service and a target active level.

These and other objects, features and advantages of the disclosure will become apparent from the following detailed description of illustrative embodiments thereof, which is to be read in connection with the accompanying drawings.

BRIEF DESCRIPTION OF THE DRAWINGS

FIG. 4 is an illustrative diagram showing the structure of a notification message according to an embodiment;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
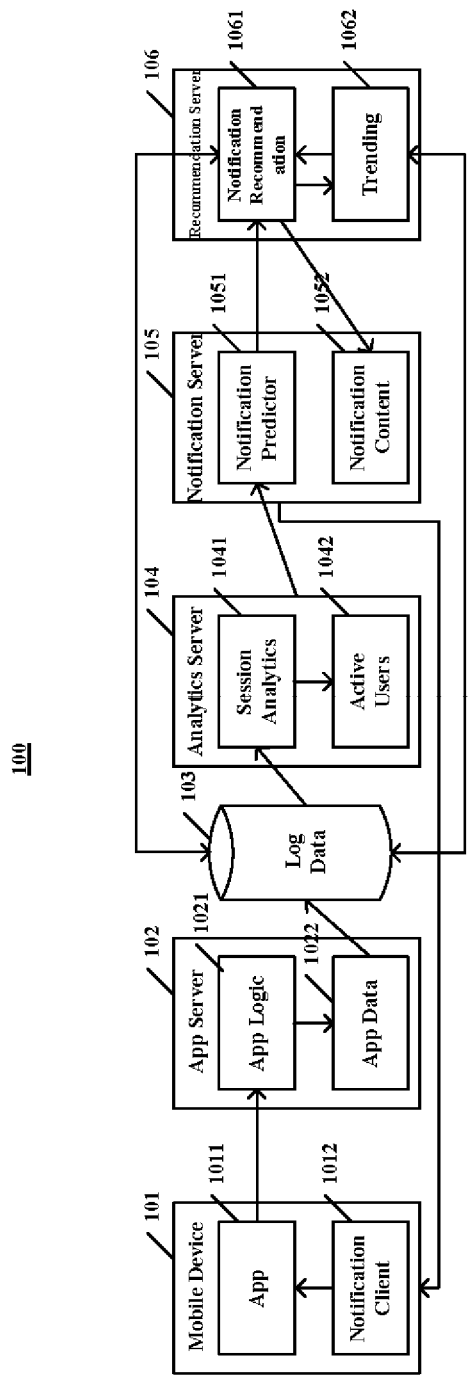
FIG. 1 is a simplified block diagram illustrating a system according to an embodiment.

As described herein, an aspect of the disclosure includes providing enhancement of a user's engagement with a service. FIG. 1 shows a system that is capable of enhancing a user's engagement with a service according to an embodiment.

As shown in FIG. 1, the system 100 comprises a user device 101 operably connected to an application server 102. The user device 101 can be any kind of user equipment or computing device including, but not limited to, smart phone, tablet, laptop and PC, running with any kind of operating system including, but not limited to, Windows, Android and iOS. The user device 101 has an app 1011 installed in it, with which a user can access the service provided by the application server 102. The service can be any kind of service including, but not limited to, news service such as Nokia Xpress Now, NBC News, social networking service such as Linkedin, Facebook, and messaging service such as WeChat, Yahoo! Mail. Alternatively, the user can also access the service with a browser installed in the user device 1011. In this case, the application server 102 would be a web server.

Context information about the user's access to the service (through the app 1011 or browser) is collected and sent to the log data 103 through the application server 102. More specifically, the context information can include any information that can be obtained, for example, time, location, information obtained by accelerometer, and information obtained by optical sensor. In an embodiment, the context information can be stored in the log data 103 as a plurality of records. Each record has a timestamp, user activity, location, accelerometer measurement, and optical sensor measurement. The location information can be GPS coordinates or cell IDs obtained by the user device 101. Further in another embodiment, the location information can be social locations translated from the raw location data, such as "home" and "work place" by some existing location mining approaches. An example of such location mining approach has been described by Eagle, N., Clauset, A. and Quinn, J. A. in their article "Location segmentation, inference and prediction for anticipatory computing" published in AAAI Spring Symposium on Technosocial Predictive Analytics (2009).

The system 100 further comprises an analytics server 104 having a session analytics module 1041 configured to compute session statistics such as session start time, session end time, session duration and content that was accessed based on the information stored in log data 103. The analytics server 104 also has an active user module 1042 configured to assess the user's active level based on the statistics of the session analytics module 1041.

In an embodiment, the user active level is measured according to the user's AU number (active user number). As known in the art, AU number is a simple metric to measure the engagement of users to a service or application, which indicates the number of active users that use the application/service at least several times (predefined) within a certain number of days. For example, when AU30=100, there are 100 users that use the application/service at least once and at most 3 times within 30 days. In the embodiment, the user's active level is measured according to the user's AU number. For example, when the user's current active level is AU30, the user has accessed the service at least once and at most 3 times on average in the past 30 days.

The system 100 further comprises a notification server 105 capable of sending notifications to the user device 101. The user device 101 has a notification client 1012 that receives the notifications from the notification server 105. The notification server 105 has a notification predictor 1051 configured to determine at what time a notification is to be sent to the user device 101. The notification predictor 105 does so in a manner described below. Further, the content of each notification is prepared by a notification content module 1052 with the help of a recommendation server 106. New content for the notification is provided by a notification recommendation module 1061. The notification recommendation module 1061 obtains candidate items for the notification from a trending content module 1062 that can access the log data 103.

Figure 3A:
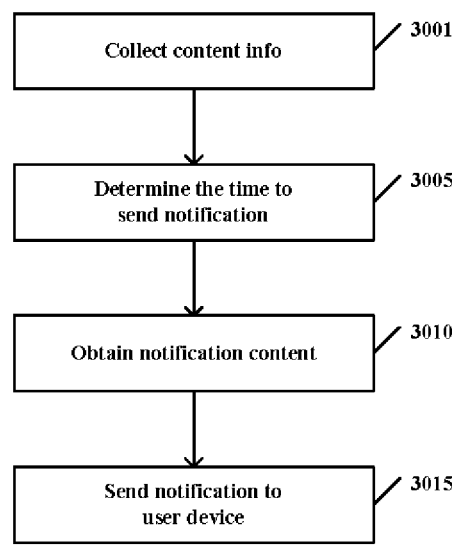
FIGS. 3A and 3B are a flow chart and an interaction diagram depicting a process for enhancing a user's engagement with a service according to an embodiment.
Figure 3B:
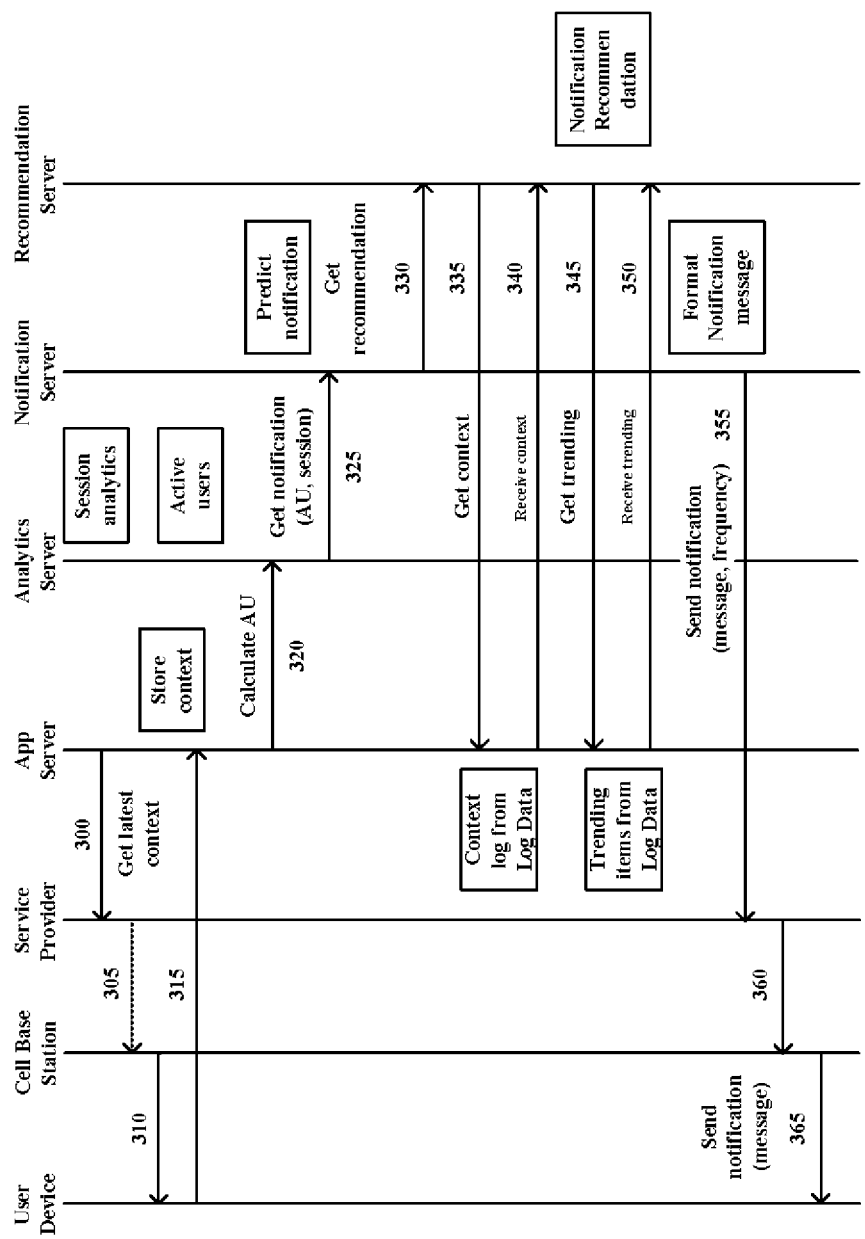

FIGS. 3A and 3B shows a process for enhancing a user's engagement with a service according to an embodiment. As shown in FIG. 3A, the process starts at step 3001 by collecting context information about the user's access to the service. As shown by lines 300, 305, 310 and 315 in FIG. 3, the application server 102 sends push requests to the user device 101 periodically, for example every 30 minutes. In response, the user device 101 sends context information back to the application server 102. As described above, the context information can include any information about the user's access, for example, time, location, accelerometer measurement, and optical sensor measurement. Further, the location information can be social locations translated from the raw location data, such as "home" and "work place" by some existing location mining approaches. Although this embodiment is described in context of cell phone system which comprises cell base station and service provider, it is noted that the disclosed solutions can also be used in other environments, such as wireless LAN, Wi-Fi.

Figure 2:
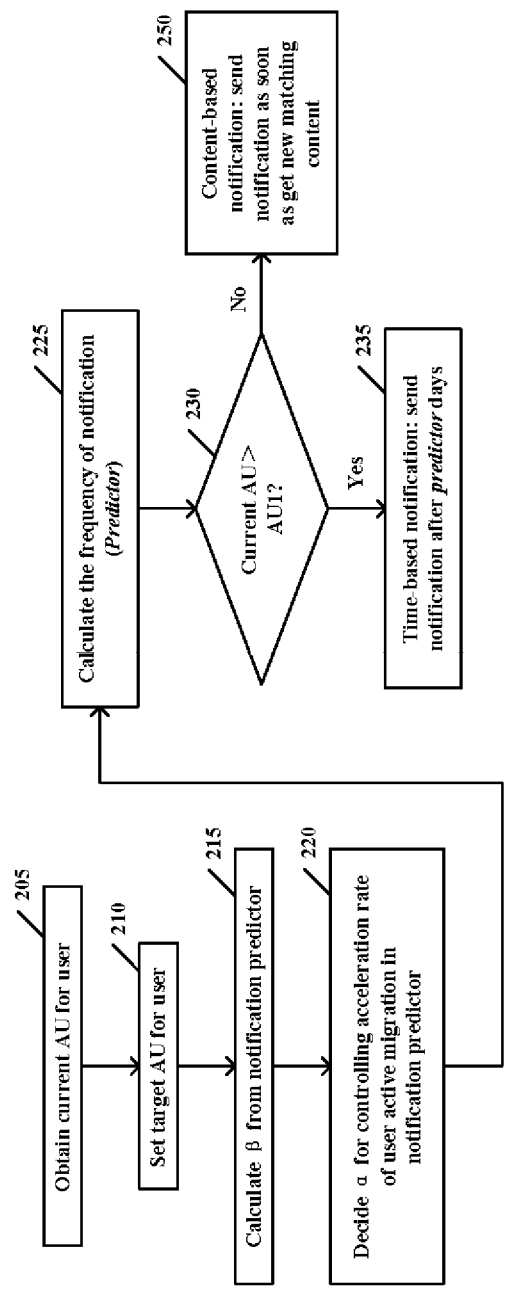
FIG. 2 is a flow chart depicting a process of determining the time to send a notification according to an embodiment.

The process then proceeds to step 3005 in FIG. 3A where the time to send a notification is determined (lines 320 and 325 in FIG. 3B). Specifically, FIG. 2 shows a process of determining the time to send a notification according to an embodiment. As shown in FIG. 2, firstly the user's current active level is obtained at step 205. In this embodiment, the active level is measured according to the user's AU number. That is, the user accesses the service at least once in an AU number of days, as described above. Then at step 210 a target active level is determined. Similar to the current active level, the target active level is also expressed as an AU number. More specifically, the target AU number is less than the current AU number of the user.

In this embodiment, a notification is to be sent in Predictor number of days as follows.

$$\text{predictor} = \beta*(AU-1)^{\alpha}+1 \qquad (1)$$

Here, $\beta$ is used to control the saturation level to migrate the user toward becoming more active. At step 215, $\beta$ is calculated from the notification predictor.

For example, if the user's current AU number is 30 and the target AU number is 25, then $\beta$ can be calculated as follows.

$$\beta*(AU-1)^{\alpha}+1=25 \Rightarrow \beta = \frac{24}{(AU-1)^{\alpha}} = \frac{24}{(29)^{\alpha}} \qquad (2)$$

Figure 5:
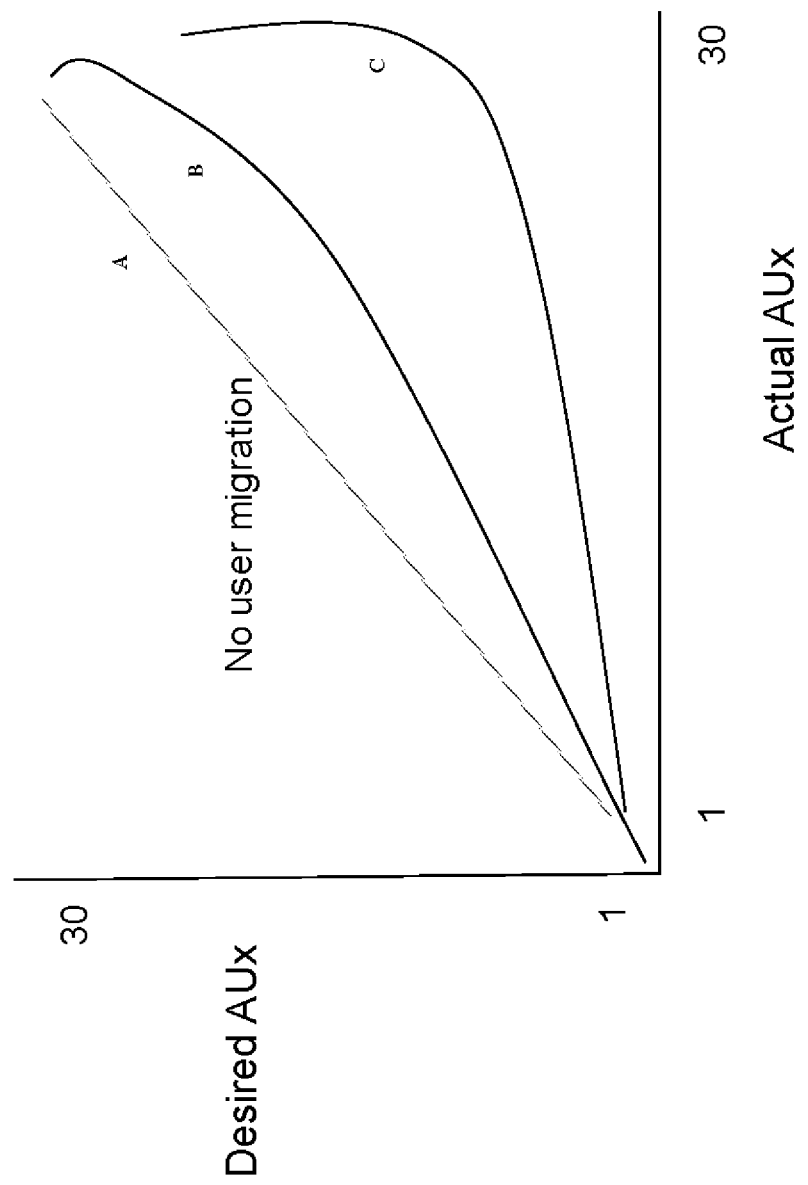
FIG. 5 is a diagram showing effects of different acceleration rates according to an embodiment.

Then, the process proceeds to step 220 where $\alpha$ is determined. Here, $\alpha$ is a value greater than zero for controlling the acceleration to migrate the user towards being more active. FIG. 5 is a diagram showing effects of different $\alpha$ values according to the embodiment. A larger $\alpha$ value results in a higher acceleration rate for an inactive user. As shown in FIG. 5, the cure C has a larger $\alpha$ value than the cure B. When $\alpha=1$, the result becomes linear, as shown by the line A in FIG. 5.

At step 225, the frequency of notification (Predictor) is determined based on the user's current AU number, the target AU number and acceleration rate $\alpha$ according to the above equation (1).

At step 230, it is determined whether the current AU number is greater than 1. If the current AU number is not greater than 1 (namely, the user accesses the service every day), then the process proceeds to step 250 where it is determined to send the notification in a content-based mode. Namely, the notification is sent to the user as soon as new matched content is obtained. For a very active user who accesses the service every day, it is necessary to connect him/her always with the most relevant content, rather than improving the active level. On the other hand, if the current AU number is larger than 1, then the notification is to be sent to the user in Predictor days.

In this way, the system can determine the date to send the notification based on the user's current active level, target active level and acceleration rate. As a result, the user can be reminded of the service without being annoyed too much.

By using the acceleration rate α, an inactive user can be pushed intensively at the beginning while a more active user will not be notified too often to avoid getting annoyed.

Although the determining step 230 is performed after calculating Predictor in this embodiment, it is noted that this step can be performed immediately after obtaining the user's current AU number (step 205). Thus, if the current AU number is not greater than 1, then the process directly proceeds to step 250, content-based notification, without performing the steps 210-225.

In addition to the Predictor days, the time of day when the notification is to be sent can also be determined from the context information according to some embodiments. In an embodiment, the context information includes information about the time the user accesses the service. By looking at the time of the user sessions aggregated over a period of time, it can be determined to send the notification at the time of day when the user usually accesses the service.

In another embodiment, the context information includes more information in addition to time of access, for example, location, accelerometer measurement, and optical sensor measurement. From such context information, the user's habit or preference with respect to use of the service can be determined through context mining technologies, such as Atomic Context-aware Preference feature with Latent Dirichlet Allocation model, and Personalized Context-aware Recommendation with LDA, etc. Examples of these applicable technologies have been described by Kuifei Yu et al. in the article "Toward Personalized Context-aware Recommendation by Mining Context Logs through Topic Models" (published in PAKDD 2012, Part I, LNAI 7301, pp. 431-443, 2012).

Thus, the system can determine what the user was doing when accessing the service, and identify user behavior patterns and user preferences from the context information. Thus the system can determine at which time of day to send the notification, so that the notification can get most attention from the user without unpleasant interruption.

Furthermore, in an embodiment, when the user migrates to a larger AU number, a new target active level is determined as an AU number in between the previous target AU number and the user's current AU number. For example, if a user has an initial AU number AU30, then the notification can be sent in 26 days. If the user follows the notification and becomes AU26, another notification can be sent in 24 days after the user's access, i.e. the new target AU number is 24. This strategy can be repeated to migrate the user to become more and more active. However, if the user does not access the service after receiving the notification, for example, she becomes AU40 instead, then the next notification can be sent in 34 day, i.e. the new target AU number is set in between the previous target AU number and the user's current AU number.

Figure 6A:
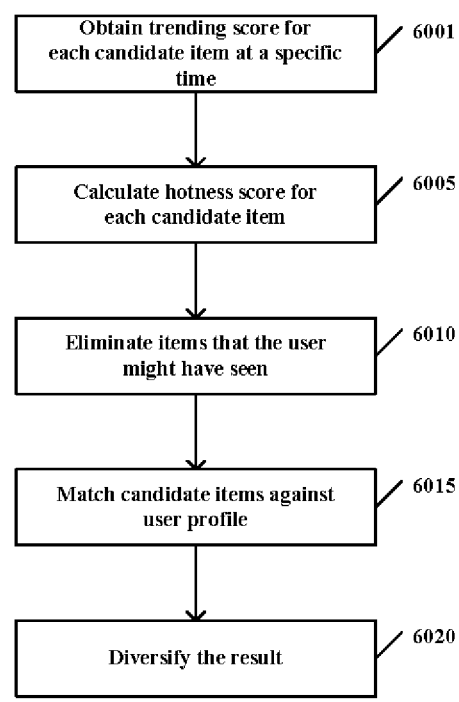
FIGS. 6A and 6B are a flow chart and an illustrative diagram showing a process of selecting items for a notification message according to an embodiment.
Figure 6B:
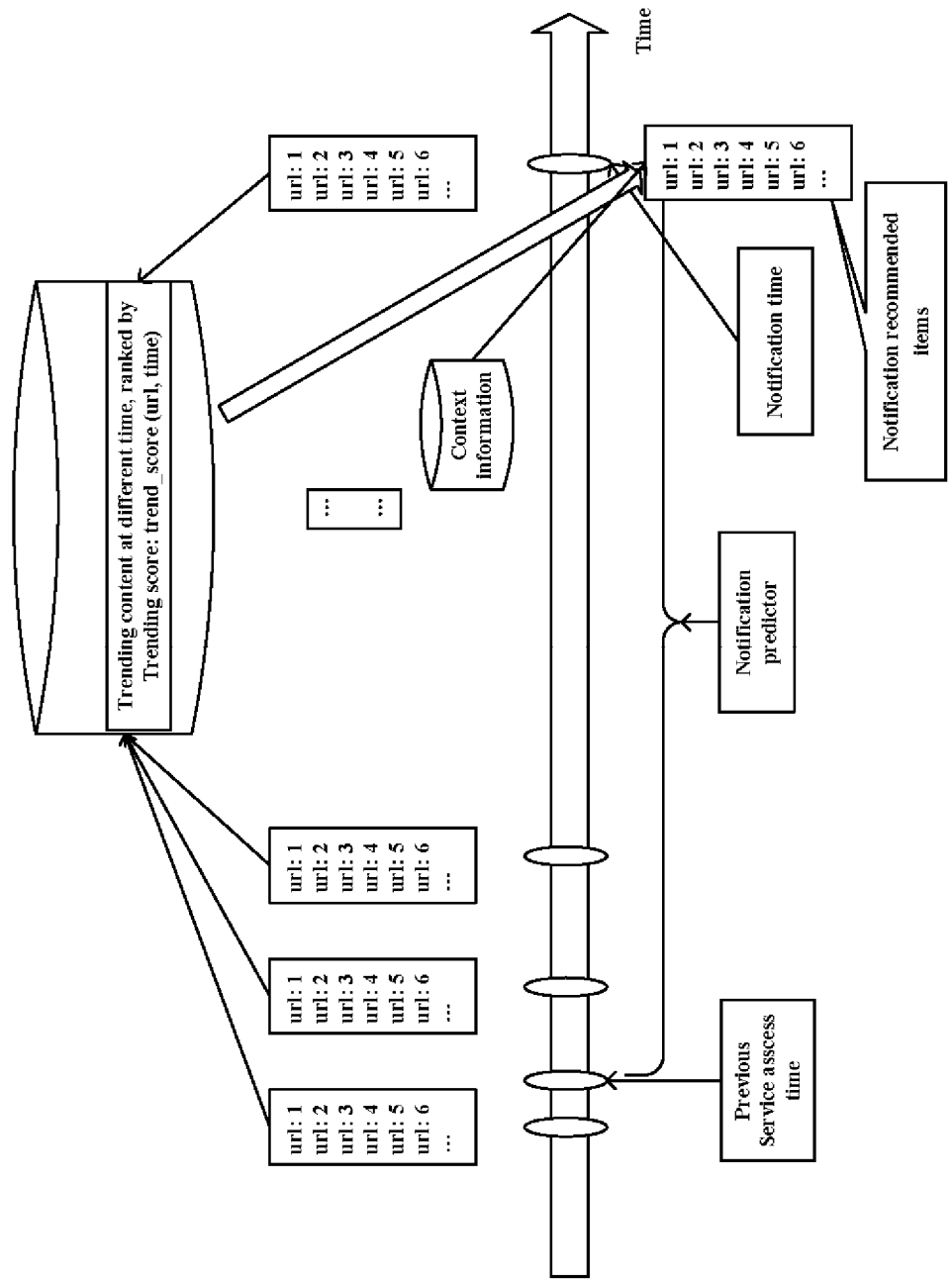

Now refer back to FIGS. 3A and 3B. After determining the time to send the notification, the process proceeds to step 3010 in FIG. 3A where the notification content is obtained (lines 330-350 in FIG. 3B). Specifically, FIGS. 6A and 6B show the process of selecting items for the notification according to an embodiment. In this embodiment, the notification has at least one item selected from a plurality of candidate items. While URLs are used as examples in this embodiment, the items can be anything that the user may be interested in, for example, news, updates, messages, comments, games, blogs and tweets.

As shown in FIG. 6A, firstly, candidate items are obtained together with their trending scores at step 6001. Here, candidate items can be obtained through existing trending algorithms, such as observing the significance of the recent change of user interaction, or rolling count algorithm used in Twitter. As shown in FIG. 6B, a candidate item (URL) at a specific time t has a trending score indicating its relative popularity at that time, which can be expressed as trend_score(url,t).

Assume that the user has not accessed the service for a period of time since time_start, and that a notification will be sent to the user at time_end. At step 6005, a hotness score is calculated for each candidate item as follows.

$$\text{hot\_score}(url, t) = \sum_{1=time\_start}^{time\_end} \text{trend\_score}(url, t) * [\alpha * (t - time\_start)] \quad (3)$$

Here, [α*(t−time_start)] is used as a weight for emphasizing the recentness of an item. That is, a new item is given more weight than an old item. The calculation of hotness score can be done more efficiently in a recursive way, so that there is no need to keep history data processed in batch. For example, the data can be processed in the real time stream as follows.

$$\text{hot\_score}(url,t) = \text{hot\_score}(url,t-1) + \text{trend\_score}(url,t) * [\alpha*(t-time\_start)] \quad (4)$$

At step 6010, those items that the user might have seen are eliminated. This can be done as follows. For each item (URL), there is a first access time, access_time(url), indicating the time that item has been firstly reported as trending in the system. It is reasonable to assume that the user might have seen those items which had been reported as trending on or before the user's last access to the service, i.e. time_start. Thus, at step 6010, the system eliminates those items that do not meet the requirement, access_time(url)>time_start.

Then at step 6015, the candidate items left are matched against a user profile that includes the user's preferences. For example, when the service is news service, the user profile may include the user's preferences, as the distribution over different categories or topics. The user profile can be learned from history data of the user's interaction with the service in the past. The candidate items are assessed and ranked according to the user's preferences. User profile matching can be achieved with conventional approaches, such as content-based or model based approaches, such as similarly measure of cosine distance, or KL divergence.

In another embodiment, the remaining recommendation results can further be filtered against the context information. As described above, the context information can include information about the user's access to the service, such as, time, location, accelerometer measurement, and optical sensor measurement. The context information can be used to infer physical and social context to determine the user's preferences. Thus the system can identify the user's behavior patterns and rank the candidate items based on the user's preferences and the characteristics of the items, such as content classification. One reference embodiment could be Personalized Context-aware Recommendation by only leveraging Individual user's context logs and Context-aware Popularity based Recommendation. Examples of the conventional approaches have been described by Kuifei Yu et al. in article "Toward Personalized Context-aware Recommendation by Mining Context Logs through Topic Models" (published in PAKDD 2012, Part I, LNAI 7301, pp. 431-443, 2012).

At step 6020, a diversity algorithm is applied to the results to extend the coverage and minimize the content stickiness. Specifically, the system can classify the recommended items based on one or more features such as category, keywords, tags, item type, information source and item location, in order to determine similarity information associated with one or more times. Using the similarity information along with the recommendation scores of the items, the system can increase or decrease the scores to enlarge ranking order differences against adjacent homogenous or similar items. An example of such diversity algorithm has been described by Jilei Tian et al. in PCT application WO2012/142751A1 published on Oct. 26, 2012.

Now refer back to FIGS. 3A and 3B. After obtaining the notification content, the process proceeds to step 3015 where the notification is sent to the user device 101 at the time determined at step 3005 (lines 355-365 in FIG. 3B). FIG. 4 shows an example of the structure of a notification message according to an embodiment. As shown in FIG. 4, the notification message includes:

- message type—indicating the message is a notification;
- user—identifying the user the notification is addressing to;
- frequency—indicating the predicted frequency of notification; and
- total number of recommended items—indicating the number of items included in the notification.

Figure 7D:
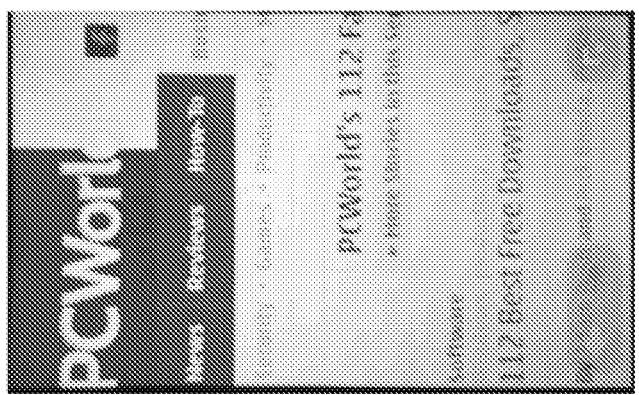
FIGS. 7A to 7D are illustrative user interfaces showing how a notification is presented to the user according to an embodiment.
Figure 7C:
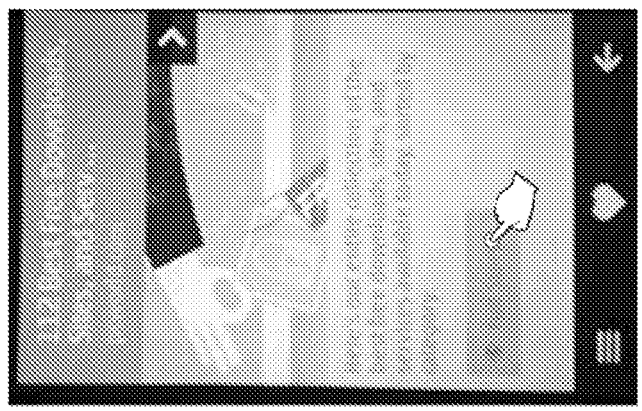
Figure 7B:
Figure 7A:
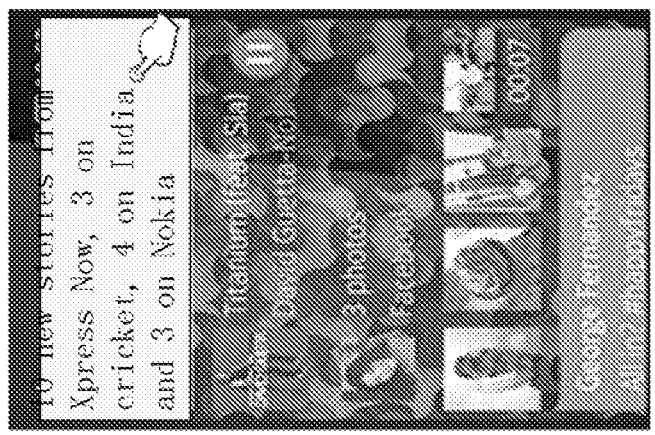

Further, the message also includes a number of topics, topics 1 to N. Under each topic, there can be one or more recommended items. FIGS. 7A to 7D show how the notification is presented to the user. As shown in FIGS. 7A to 7D, "Nokia Xpress Now" is used as an example of the service. First, the notification is received as a message on the user device 101 that indicates that there are new items to be read (FIG. 7A). The items are classified into categories. The number of items that come from a certain category can be displayed in the message. This lets the user know the type of new content and prompts the user to be curious, so that the user will go to the application/service. Second, the user can tap on the message to open the app. In this example, "Nokia Xpress Now" app is opened and the list of new items is displayed (FIG. 7B). As described above, the new items are included in the notification message. Third, the user experience is similar to that of the regular app. In the example of "Nokia Xpress Now", the user can first see an abstract of each item (FIG. 7C) and tap to view the full story (FIG. 7D). In this way, the embodiment can provide a simple, clear and consistent user experience.

As shown in the above-described embodiments, the user's engagement to the service can be enhanced by notifications based on the user's actual active level and context information, instead of the arrival of new content. If the user migrates to a smaller AU number, then the target AU number can be adjusted to be even smaller. If the user migrates to a larger AU number, then the target AU number is adjusted to be in between the previous target AU and current AU numbers. This prevents disruption and interruption to the user as the notifications are adaptive to the user's behaviour in using the app/service. The system can choose the "sweet spot" to frequently send notifications to the user without getting the user annoyed.

Furthermore, in terms of the content of notification, sufficiently relevant items are selected through matching the candidate items against the user's preferences, which can be obtained from the context information. Further, through eliminating those items that the user might have seen and adding weight of recentness, it is ensured that the matched items are recently trending, hot and new for the user.

The conventional notification basically makes the user easy to access the information. It is purely from user experience perspective, without considering users' churn rate or users' engagement/stickiness. According to the above described embodiments, for a possible churn user, who has not used the service for long time, the notification becomes a reminder adaptive to the user behavior. In this way, the system can avoid bothering the user too much. For example, there may be two groups of churn users: (1) those who forget to use the service due to distractions; and (2) those who do not like the service. For group (1), the reminder may have great effect, making the users start using the service again. For group (2), the reminder may not help too much, but it can at least give the users an opportunity to see that the service might be improved since then, as it is easy to access through the notification service. At least it may not hurt too much since the reminding pace follows the user's behavior and is less aggressive.

According to an aspect of the disclosure it is provided an apparatus for enhancing a user's engagement with a service, comprising means configured to carry out the methods described above. In an embodiment, the apparatus comprises means configured to obtain the user's current active level with respect to the service; means configured to determine a target active level; and means configured to send the user a notification about the service at a time determined based on the user's current active level and the target active level, so that the user is notified of the service without being annoyed. The user's current active level and target active level can be measured according to the user's access to the service at least once in an active user (AU) number of days. The apparatus can further comprise means configured to determine at which date to send the notification based on the user's current active level and the target active level. The AU number of the target active level can be less than the AU number of the user's current active level.

In an embodiment, the apparatus further comprises means configured to determine an acceleration rate. The date to send the notification is determined based on the current and target active levels, and the acceleration rate.

The apparatus can further comprise means configured to determine a new target active level if the user migrates to a larger AU number. The new target active level has an AU number in between the AU number of the previous target active level and the AU number of the user's current active level.

In an embodiment, the apparatus further comprises means configured to collect context information about the user's access to the service. The apparatus can further comprise means configured to determine at which time of day to send the notification based on the context information. The context information may comprise at least one of time, location, accelerometer measurement, and optical sensor measurement.

In an embodiment, the notification has at least one item, and the apparatus further comprises means configured to obtain a plurality of candidate items; and means configured to select, from the plurality of candidate items, at least one item to be used in the notification. Further, the apparatus can comprise means configured to calculate a hot score for each of the candidate items based on its trending level and recentness; means configured to eliminate those candidate items that have been firstly reported as trending before the user's last access to the service; and means configured to select at least one item from the candidate items based on the hot scores of the candidate items and/or a user profile having information about the user's preferences. The user's preferences can be determined from the context information.

It is noted that any of the components of the system 100 depicted in FIG. 1 can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
    obtaining, by a processor, a current active level of a user with respect to a service, the current active level indicating a number of times the user has accessed the service over a specified time period;

adjusting, by the processor and based on the current active level, a target active level for the user, the target active level being shorter than the current active level, the target active level being adjusted by selecting a value between the current active level and a previous target active level in response to an increase in the current active level;

determining, based at least on the adjusted target active level, a frequency of notifications sent to the user;

determining, by the processor and based on the determined frequency of notifications, a time to send the user a notification about the service; and determining, by the processor, to send to the user, the notification at the determined time.

2. The method of claim 1, further comprising:
repeating the obtaining, the adjusting, and the determining.

3. The method of claim 1, further comprising:
determining an acceleration rate, wherein the acceleration rate determines a rate of change of the frequency of sending the notifications, wherein the time to send the notification is further determined based on the target active level and the acceleration rate.

4. The method of claim 1, further comprising:
collecting context information about the user's access to the service.

5. The method of claim 4, wherein the sending further comprises:
determining a time of day to send the notification based on the context information.

6. The method of claim 4, wherein said context information comprises a time, a location, an accelerometer measurement, and/or an optical sensor measurement.

7. The method of claim 1, wherein the notification has at least one item, and further comprising:
obtaining, by the processor, a plurality of candidate items; and
selecting, by the processor and from the plurality of candidate items, the at least one item to be used in the notification.

8. The method of claim 7, wherein the selecting comprises:
calculating a hot score for each of the plurality of candidate items based on a trending level and a recentness of the corresponding candidate item;
eliminating at least one of the plurality of candidate items that have been previously reported as trending before the user's last access to the service; and
selecting the at least one item from the plurality of candidate items based on the hot scores of the plurality of candidate items and/or a user profile having information about user preferences.

9. The method of claim 8, wherein the user preferences are determined from the context information.

10. An apparatus comprising:
at least one processor; and
at least one memory storing computer program code, wherein the at least one memory and the stored computer program code are configured, with the at least one processor, to cause the apparatus to at least:
obtain a current active level of a user with respect to a service, the current active level indicating a number of times the user has accessed the service over a specified time period;
adjust, based on the current active level, a target active level for the user, the target active level being shorter than the current active level, the target active level being adjusted by selecting a value between the current active level and a previous target active level in response to an increase in the current active level;
determine, based at least on the adjusted target active level, a frequency of notifications sent to the user;
determine, based on the determined frequency of notifications, a time to send the user a notification about the service; and
determine to send, to the user, the notification at the determined time.

11. The apparatus of claim 10, wherein the apparatus is further caused to at least determine the time based on the target active level and an acceleration rate.

12. The apparatus of claim 10, wherein the apparatus is further caused to at least determine a time of day to send the notification based on context information about the user's access to the service.

13. The apparatus of claim 12, wherein said context information comprises a time, a location, an accelerometer measurement, and/or an optical sensor measurement.

14. The apparatus of claim 10, wherein the notification has at least one item, and the apparatus is further caused to at least:
obtain a plurality of candidate items and select, from the plurality of candidate items, the at least one item to be used in the notification.

15. The apparatus of claim 14, wherein the apparatus is further caused to at least calculate a hot score for each of the plurality of candidate items based on a trending level and a recentness of the corresponding candidate item, eliminate at least one of the plurality of candidate items that have been previously reported as trending before the user's last access to the service, and select the at least one item from the plurality of candidate items based on the hot scores of the plurality of candidate items and/or a user profile having information about user preferences.

16. The apparatus of claim 15, wherein the user preferences are determined from the context information.

17. The method of claim 1, wherein the service comprises a news service, a social networking service, and/or a messaging service.

18. The method of claim 1, wherein the current active level and the target active level comprise active user numbers.

19. The method of claim 1, wherein the active user number comprises a metric to measure an engagement of the user to the service, and wherein the metric indicates that the user has used the service at least once within a certain number of days.

* * * * *